United States Patent [19]
Tendler et al.

[11] Patent Number: 5,163,158
[45] Date of Patent: Nov. 10, 1992

[54] MODULAR COMMUNICATIONS SYSTEM INCLUDING A PORTABLE UNIT RANGE EXTENDER AND SELECTIVE-CALL SYSTEM

[76] Inventors: Robert K. Tendler, 19 Lawrence Ave., Chestnut Hill, Mass. 02167; Frank P. Karkota, Jr., Cowdry Hill Rd., Westford, Mass. 01886

[21] Appl. No.: 758,674

[22] Filed: Sep. 12, 1991

Related U.S. Application Data

[62] Division of Ser. No. 296,514, Jan. 12, 1989, Pat. No. 5,073,972.

[51] Int. Cl.$^5$ .............................................. H04B 1/16
[52] U.S. Cl. .................................. 455/11.1; 455/38.1
[58] Field of Search .................... 455/7, 11, 17, 18, 33, 455/54, 56, 78, 88, 212, 218, 35, 38, 89, 11.1, 38.1; 340/825.44, 825.5

[56] References Cited

U.S. PATENT DOCUMENTS

| | | | |
|---|---|---|---|
| 4,539,706 | 9/1985 | Mears et al. | 455/11 |
| 4,906,989 | 3/1990 | Kasugai | 455/89 |
| 5,058,205 | 10/1991 | Roehrs et al. | 455/35 |
| 5,073,972 | 12/1991 | Tendler et al. | 455/35 |

*Primary Examiner*—Curtis Kuntz
*Attorney, Agent, or Firm*—Robert K. Tendler

[57] ABSTRACT

A method and apparatus for extending the range of portable RF transceivers and for providing a select-call system includes a hybrid remote control system to extend the range of a portable transceiver and to permit the operator of a vessel or vehicle to communicate hands-free through the utilization of his own full power base station and antenna, in which a modified full duplex system is used to control transmit and receive cycles from the portable unit so that the system can operate regardless of interference on the channel to which the base station is timed. Also provided is a selective calling system in which a recipient's transceiver is turned on by the transmitting transceiver through punching in the recipient's call letters or at least its address. As an added feature, the transmitting station automatically transmits its own call letters which are displayed at recipient's receiver. This system thereby quiets all receivers until the particular transceiver is digitally addressed. An emergency code such as (0,0,0,0) activates all receivers for emergency transmissions on an emergency channel, such as on VHF channel 16, so that the emergency channel can be monitored without distraction from non-emergency traffic. This modular approach provides a universal system in which standard transceivers can be accommodated.

9 Claims, 5 Drawing Sheets

MODULAR COMMUNICATIONS SYSTEM INCLUDING A PORTABLE UNIT RANGE EXTENDER AND SELECTIVE-CALL SYSTEM

This is a divisional of copending application Ser. No. 07/296,514, filed on Jan. 12, 1989, now U.S. Pat. No. 5,073,972.

FIELD OF THE INVENTION

This invention relates to mobile communications and more particularly to a system for both extending the range of a portable or miniaturized battery-powered transceiver and for providing a system for addressing transceivers.

BACKGROUND OF THE INVENTION a. Transceiver Range Extender

It will be appreciated that in marine or aviation use, portable battery-powered portable transceivers are limited both in their power and also by the height of the antenna above the terrain. Moreover the antennas for the portable units, being of a shortened variety, are inherently very inefficient. Because these units use self-contained batteries, the amount of power is limited so that full 25 watt operation is not possible. The above conspires to limit the range of the portable transceiver to reliable communications of only between three and six miles. On the other hand standard VHF marine transceivers with properly located and tuned antennas have a line of sight range of 25 miles. Of course, longer ranges are achievable with increased antenna height.

In an effort to extend the range of portable VHF marine transceivers, auxiliary antennas have been attached to the portable unit which are both cumbersome and often ineffective due to their temporary mounting and the low height. Due to the restrictions imposed by the FCC and also due to power available from NICAD batteries, the maximum transmit power is usually limited to six watts. Moreover at a six watt power level, battery lifetime is often no more than 20 minutes of transmission.

It should be noted that the portable unit is very popular because it provides convenience in that one can move around one's boat and still communicate albeit only over short distances. However, this short range limitation is a very frustrating problem to the boater in spite of the convenience of a portable unit.

By way of background, long range communication repeaters have been utilized to extend the range of portable transceivers. These systems in general are full duplex, split frequency systems, with a receiving channel at one frequency, and a transmitting channel at another frequency. Note that all users have equal access to a repeater and that in general they operate only on two assigned split channels. Thus repeaters can handle only one conversation at a time for the entire coverage area. They therefore do not operate in any manner similar to a VHF radio which is a simplex system and has as many as 182 assigned channels. It will also be appreciated that FCC regulations normally preclude the use of unattended repeaters or unattended transmitters for unrestricted multi-channel use.

The result of the inability to utilize repeaters in the marine portable service market is that boaters are denied the convenience of a portable or hands-free system capable of communicating over ranges normally associated with the conventional VHF base station.

Note further that numerous remotely-controlled base stations exist both in amateur and in land mobile services, in which transmitter keying is dependent upon the absence of a subaudible carrier to delineate the end of a received transmission. These services do not however experience the same problems of congestion and interference as do either the uncontrolled citizens band radio service or the marine band radio service. For commercial service, channels can be assigned as well as subaudible tone frequency to control transmit/receive cycles. The result is that simplex communication can be achieved with the utilization of the subaudible carrier tone to control transmit/receive cycles.

The problem with utilizing a subaudible tone system in the marine or citizens band environment is that the subaudible tone system will not work without assigning individual tones. Thus, in order for any simplex service to utilize subaudible tone control, other interfering transceivers must either not use subaudible tones, or be restricted to subaudible tones of a different frequency.

Moreover, absent a subaudible tone system, the interference mentioned hereinabove is so severe in the marine VHF bands, that the base station would detect an interfering station in the background which would prevent switching the base station to its transmit mode. This is because the base station would be transmitting the received interfering signal to the portable unit which would prevent the portable unit from transmitting a signal to the base station to change from a receive to a transmit mode. Thus the operator of the portable unit would have to wait for the interfering station to cease transmission before he could switch his base station to the transmit mode. In summary, on crowded channels, simplex transmission alone cannot be used to extend the range of portable units through the use of remotely-controlled base stations.

In contradistinction to the simplex systems described above or to the duplex systems noted hereinbefore, the Subject System is not a repeater system but rather involves the remote control of a base station through a hybrid duplex system and a very low power, limited range, inexpensive portable unit. Both AM and FM service is contemplated, with FM being preferred. For simplicity of explanation it will be assumed that the base station operates in the 156 and 170 megahertz VHF marine band, whereas the remote control system operates in the 49 megahertz band. The reason for the low power of the portable unit is not only one of cost, but also is one relating to limiting interference. The reason for the modified duplex operation is that, if pure simplex operation were to be desired, the transmission from the base control transceiver to the portable unit would desirably cease upon termination of the incoming signal on the channel. However a distant signal may continue to be received by the base station long past the time that the desired signal has ceased. This then would result in continued transmission to the portable transceiver despite the fact that the desired signal has ceased, which would block the ability to transmit a signal from the portable unit to the base control transceiver.

In order to prevent this occurrence, the base control transceiver must be able to receive a signal from the portable unit on a first frequency so as to change the base station from a receive to a transmit mode while a signal is being transmitted to the portable unit on a second frequency. This can only be done with a hybrid duplex arrangement in which the base control transceiver can simultaneously receive one of the split channel 49 MHz signals from the portable unit while transmitting the other split 49 MHz channel signal to the portable unit. It will be appreciated that the marine VHF radio is simplex system, whereas the communication to and from the portable unit is duplex. The term duplex refers to the capability of handling transmission and receipt of signals simultaneously on two different frequencies.

As part of the Subject System, the effective range of a portable or miniaturized battery-powered transceiver is extended through the use of the remotely-controlled base unit which is under the control of a low power drain base control transceiver that is always ON, in which the base control transceiver is powered by its own standby battery. Note that the base control transceiver can be built into the base station; or it can be a separate module. In any event, the standby battery is internal to a base station control transceiver. When a properly encoded identification (I.D.) or "authorization" code from the portable receiver is detected, the base station is turned on and connected to ship's power. From there on, the full power of the base station is available to the portable transceiver.

In operation, the base station transceiver is provided with the above-mentioned base control transceiver which communicates with the portable unit in the following manner. The base control transceiver receives and transmits respective split channel signals on $f_1$ and $f_2$ in the 49 MHz band. When the portable unit is first turned on, the "authorization" code is transmitted to the base control transceiver to activate the remote control system to allow reception by the portable unit of transmission on the marine channel designated by the channel selector of the portable unit. This channel is designated by a "channel select" code, followed by a "squelch" code to set the squelch of the base station. When it is desired to transmit from the portable unit, a push-to talk (PTT) button is depressed which again transmits the predetermined "authorization" or I.D. code on $f_1$ to the base control transceiver. Until the portable unit is turned on, the base control transceiver is operating on a spare or NICAD rechargeable batteries, with the transceiver in its quiescent state drawing no more than a few milliamperes. Upon receipt of the authorization code when the portable unit is switched ON, the unattended base control transceiver automatically turns on the base station transceiver and thence proceeds to set the channel of the receiver to that dialed in at the portable unit. At this time the base station squelch may also be set. The transmission from the portable unit is demodulated at the base control transceiver and the audio recovered therefrom is - coupled to the base station transmitter along with the appropriate channel and a transmit or keying command to place the base station transceiver in the transmit mode. From this point the audio is transmitted by the base transmitter at full Power through the antenna normally coupled thereto.

Thus audio is transmitted from the portable unit, as well as the factory-preset "authorization" I.D. code. The I.D. code is sent every time the push-to-talk (PTT) switch is depressed to place the base unit in the transmit mode. A different "end of transmission" code is sent each time the PTT switch is released to place the base station in the receive mode. In one embodiment this is a subaudible, audible, or superaudible tone.

Once the base control transceiver has received and identified the appropriate authorization code from the portable unit, in one embodiment the entire remote control system is locked on, absent time-out timers, until an "end of use" code, is sent from the portable unit. This "end of use" code may be generated in response to turning of the ON/OFF switch of the portable unit to its OFF position, and precludes the necessity of physically turning off the base unit. Thus the system may be provided with a separate "end of use" code, so that the base station can be remotely shut off with the turn off of the portable unit.

More importantly for the unattended portion of the system, the base unit is turned off by a timer a predetermined time after the I.D. code is sent, so that, for instance, the base unit will be disabled fifteen minutes after the last I.D. code, this turns the base station off and is provided so that no unauthorized RF transmission on $f_2$ will occur, both to save batteries and for any unforseen activation of the system which would result in useless transmission on $f_2$ from the base control transceiver. This timer also disables any unnecessary power-draining circuitry in the base control transceiver which does not affect its standby receive mode. The above timer can be defeated by a separate switch if longer use is required, such as all-day monitoring of a channel. If this is the case the "end of use" code sent when the portable unit is turned off prevents battery run down and further 49 MHz transmission.

As a further safeguard, in one embodiment a second timer disables the base station transmit mode, for instance, two minutes after an "authorization" code is received. The purpose is to counter any loss of control of the base station transmitter so that no unattended RF transmission from the base station can exceed the preestablished time period. If a transmission lasts more than two minutes, it is presumed that control over the base unit is lost and all transmission from the base station is shut down by returning it to the receive mode. It will be appreciated that the "end of transmission" code causes the base station to go into the receive mode even if a carrier is present on the 49 MHz band, thus preventing other portables from hanging up the system.

More particularly, in the receive mode the base control receiver receives the incoming signal from the portable unit, demodulates it, and provides both recovered audio to the base station transceiver and a "carrier present" signal to activate the base station transmitter. The base station transmitter is operated only when all four conditions are present: i.e., a valid ID code has been received; an end of transmission has not been received; the carrier present is high; and, the short duration timer has not timed out or has been reset. The base control transceiver in turn transmits the recovered audio at 49 megahertz on $f_2$ to the portable unit, eg. on one half of the split channel originally designated by the portable unit. The portable unit then reproduces the audio at the remote location.

As a feature of the subject system, a further safeguard for the unattended portion of the system may include a mandatory brief receive cycle prior to any initial base station transmission so that the operator can ascertain if his chosen channel is free. This can be accomplished by use of a base station-ON tone transmitted to the portable unit once the portable unit makes contact with the base station. If there is traffic on the channel it will be heard after the tone.

As a secondary feature, both 49 MHz units may be provided with a clear channel search mode when the portable unit is first turned on. For FM systems, circuits within one unit scans the available channels for the one with minimum signal. Once this occurs, both units are set to this channel.

Alternatively, one can search for a clear channel by measuring relative signal strengths and choosing the channel with the least relative signal strength indicator (RSSI) output. This improves the duplex communication, and is a system which can also be actuated at any time from the portable transceiver by turning it OFF and ON.

What will be appreciated is that with the remote control of the base station, a low power, 1/10 watt, portable or even hands-free operation can be achieved so that the operator of a vessel can walk around his boat and communicate through the base station without any hard wire connection to the base unit. Moreover, should a person be on a beach or in a dingy, he can access the base station, within a thousand feet, and thereby utilize the facilities of the remotely controlled base station to effectuate long distance communication. This can be done even before the operator arrives at his vessel. Because of the low power of the portable unit, interference is kept within acceptable limits. Of course if full 6 watt power is desired, the portable unit may be provided with a full up VHF transceiver capability in addition to its remote control function.

Note that while VHF service is discussed herein, the Subject System may be used in any service such as SSB, citizen's band, or the amateur band if remote control of an unattended multi-channel base station is desired.

In summary, a combined simplex/duplex remote control system is provided to extend the range of a portable transceiver and to permit the operator of the portable unit to communicate hands-free through the utilization of his own full power base station and antenna. Here a modified full duplex system is used to control transmit and receive cycles from the portable unit so that the system can operate regardless of interference on the channel. This approach provides for a universal system in which other standard transceivers can be communicated with without providing them with subaudible tone capability or in any way modifying them. In one embodiment the base control transceiver is provided with a rechargeable battery and is left on continuously, with the base control transceiver being directly coupled to the vessel s battery so that the base unit can be turned off until such time as the appropriate I.D. code is received from the portable unit, at which point the base station is connected to battery power. Thus the base station can be left unattended in a low power mode until such time as it is accessed by its corresponding portable transceiver which sends the appropriate I.D. code. The base station can therefore be operated both in its normal mode or remotely when accessed through the transmission of the particular I.D. code provided by the portable unit.

As a result, the base station can be remotely controlled by a very low power, limited-range, portable unit to extend the nominal 3 mile range of the portable unit to the full operating range of the base station. The range extension is a result of the increased base station power, as well as its increased antenna height and better antenna efficiency.

Safeguards for unattended use include "authorization" codes, "end of transmission" codes, "end of use" codes and two timers for time-out a first relatively long predetermined time after "authorization" code receipt to shut down the base station and all RF transmitting systems; and a second relatively short predetermined time after the beginning of a transmission as evidenced by "authorization" code receipt to return the base station to its receive mode, thereby to solve the problem of loss of base station control.

As another feature, the portable unit may also be used to transmit an "end of transmission" tone burst to the base control transceiver on whichever split frequency is not in use. This assures that an adjacent close transmitter will not interfere with "end of transmission" tones from the portable unit, and permits returning the base station to the receive mode, even if there are interfering 49 MHz signals in the area.

Thus the quasi-duplex system is invoked only when there is congestion on the frequency that the base station is tuned to; and also if there is interference on the remote signalling frequency This prevents the system from locking on to a spurious or undesired interfering signal.

b. Selective Call System

By way of background, with respect to the selective call portion of the Subject Invention, it will be appreciated that when transceivers are utilized on a multi-channel unrestricted basis, the amount of incessant chatter and traffic on each of the individual channels makes it difficult for the user to monitor any given channel in order to ascertain that his particular transceiver is being addressed or that a particular call is intended for him. While addressing systems have been utilized in the past, none has been conveniently adapted to unrestricted multi-channel service. For instance, on the VHF marine emergency channel 16, the operator of a vessel may be harassed continuously with low-priority communications, despite the admonitions of the coast guard to stay off channel 16 except for essential traffic. Channel 16 is the international emergency channel for marine vessels, and in fact is a universal distress channel. It is the duty of all operators of vessels to continually monitor channel 16. However, it is only with difficulty that an individual operator can do so, because of the amount of unwanted traffic on the channel.

Moreover, if the particular vessel is awaiting communications on a particular channel from another vessel, since all channels are crowded, the recipient must listen to all traffic in order to ascertain that a particular transmission is intended for him. The result is that even when schedules are made up for the transmission of traffic, oftentimes the traffic is missed due to the unacceptably crowded conditions on the multi-channel unrestricted band.

While various addressing systems have been utilized for controlled channels, the utilization of a so called "boat-call" or addressable transceiver has met with little success due to the inability to assign telephone numbers in a timely and economically attractive fashion.

It will however be appreciated that the Federal Communications Commission licenses each VHF transceiver as well as each citizens band transceiver, with call letters or call signs being associated with each license. With respect to VHF radio licenses, there is a four digit numeric code after a three letter code which distinguishes one VHF transceiver license from another. While these call letters are supposed to be utilized during the transmission of traffic, it is honored more in the breach than in actuality. The problem therefore for the Federal Communications Commission or other monitoring authority is to be able to trace errant transmissions which do not conform with governmental standards.

In order to solve the problems of the crowded bands, both for marine traffic and also for citizens band traffic, in the Subject Invention the modular system includes a digital add-on system for addressing a recipient base station through the utilization of the call sign of the base station. It is a feature of the Subject Invention that the call sign of the station is programmed into the add-on unit so that with each selective call, its call sign is transmitted not only to the recipient transceiver, but also to any authority chosing to monitor the signals.

In particular, the modular system is provided with a select-a-call module which has a key pad suitable for entering the recipient's call sign so that the recipient's transceiver can be addressed. In one embodiment, the addressing code is merely the last four digits of the call sign which is a convenient way of designating the particular transceiver involved. With the receipt of a digitally-encoded burst from the transmitting transceiver, the receiving transceiver decodes this and turns its normally quiescent speaker ON when the appropriate address has been received. Concomitantly, there is a display of the caller's number or call sign so that the recipient can obtain the identity of the vessel or transmitter which is placing the call.

Included in the multi-purpose full-function base station transceiver is a muting circuit for muting the speaker while the unit is receiving on a channel determined by the channel selector switch on the base station unit. The result of providing such a system is that the speaker is muted until such time as a signal is available on the particular channel and contains a signal burst which turns the muted speaker to an unmuted state upon receipt of its particular address.

As a result, those wishing to monitor a particular channel may turn on the base station receiver, set it to the particular channel desired, and then leave the unit on for extended periods of time without having to listen to traffic on the selected channel. What this means is that the receiver can be muted until such time as it is addressed. This has the advantage that the recipient need not listen to idle chatter or congested channels in order to receive a message which is intended solely for him.

One of the more important features of the subject selective call system is that anyone utilizing such a system may override the muting circuits of all other such systems by merely dialing in an emergency code such as four zeros. What this does is permit the utilizer of such a system to mute his radio, for instance, until such time as there is a true emergency or priority call on the channel. What happens in this case is that the calling vessels identity is immediately known through the utilization of tis call letters, whereas the vessel having an emergency can turn on every vessel s radio in the area so that those monitoring the emergency channel will be able to respond to the emergency situation.

This solves the problem for the boater who is under an obligation to monitor VHF channel 16 but refuses to do so because of the amount of unnecessary traffic on the channel. His transceiver will be muted to all but emergency communications, which emergency communications will be in a sense supervised because upon utilizing such a system the call letters of the distressed vessel will be transmitted. This aids the authorities in obtaining identity of the distressed vessel while at the same time permitting monitoring of unauthorized transmissions due to the transmission of the identity of the transmitting transceiver each time the selective calling function is accessed.

It is also useful for the Coast Guard or other governmental authority to be able to turn on all radios within the area of interest through the transmission of the emergency code, such as a (0, 0, 0, 0) code.

It will be appreciated that the multi-purpose full-function base station transceiver may be utilized in a normal mode so as to be compatible with standard transceivers, be they VHF transceivers or citizens band transceivers. Also, as will be appreciated, the selective call function can at least in part, at the multi-purpose full-function transceiver, should the operator wish to operate the multi-purpose full-function transceiver in a standard mode.

In order to accomplish this selective call feature, tone burst signalling is utilized in the add-on unit which provides suitable signalling on the carrier from the associated base station.

There is also a property of the Subject select-a-call system that prior to the activation of the transmitter to transmit the address of the recipient's transceiver, the particular channel is monitored. What this means is that prior to placing a selective call signal on a particular multi-use unrestricted channel, the system automatically puts the transceiver in its receive mode, at lease temporarily, so that the individual making the call can ascertain that the channel is free. This is important so that there is no unauthorized signalling on a given channel so as to interfere with other traffic on the channel. This feature may be employed at the beginning of a transmission when a particular call sign or number is dialled up.

In summary, a select-call system is employed which utilizes digital bursts either subaudibly or audibly imposed on the carrier of the particular base station transceiver, in which the add-on module has both the ability to place a select-call, as well as display the call letters of a transmitting unit. Also provided may be a "hook" key so that the designated channel may be monitored. Finally, it will be appreciated that the aforementioned portable transceiver utilized with respect to the remote control of the base station may be provided with the selective call feature.

SUMMARY OF THE INVENTION

In summary a modular communications system includes both a range extender system and a system of addressing predetermined transceivers. In particular, a method and apparatus including a portable RF hybrid remote control system to extend the range of a portable transceiver is used in the marine or other environments, and to permit the operator of a vessel or vehicle to communicate hands-free through the utilization of his own full power base station and antenna, in which a modified full duplex system is used to control transmit and receive cycles from the portable unit so that the system can operate regardless of interference on the channel to which the base station is tuned. In one embodiment, the base control transceiver is provided with a rechargeable battery and is left on continuously, with the base control transceiver being directly coupled to the vessel's battery so that the base unit can be turned off until such time as the appropriate authorization code is received from the portable unit, at which point the base station is connected to battery power. Safeguards for unattended use include "authorization" codes, "end of transmission" codes, "end of use" codes and two timers for time-out a first predetermined relatively long time after "authorization" code receipt to shut down the system, and a second predetermined relatively short time after beginning of a transmission evidenced by "authorization" code receipt to return the base station to its receive mode, thereby to solve the problems of unattended overly-long transmission from the base control transceiver to the portable unit or loss of control of the unattended base station. This approach provides a universal system in which other standard transceivers can be accommodated without providing them with subaudible tone transmit/receive control or in any way modifying them.

Also provided is a selective calling system or boat-call system in which a recipient vessel's transceiver is turned on by the transmitting transceiver through punching in the recipient's call letters or at least its digits. The transmitting station automatically transmits its call sign which is displayed at recipient's receiver, thereby to quiet all receivers until addressed. An emergency code such as (0,0,0,0) activates all receiver for emergency transmissions on an emergency channel, such as on VHF channel 16, so that the emergency channel can be monitored without distraction from non-emergency traffic.

BRIEF DESCRIPTION OF THE DRAWINGS

These and other features of the Subject Invention will be further understood in conjunction with the Detailed Description taken in with the drawings of which.

DETAILED DESCRIPTION

Figure 1:
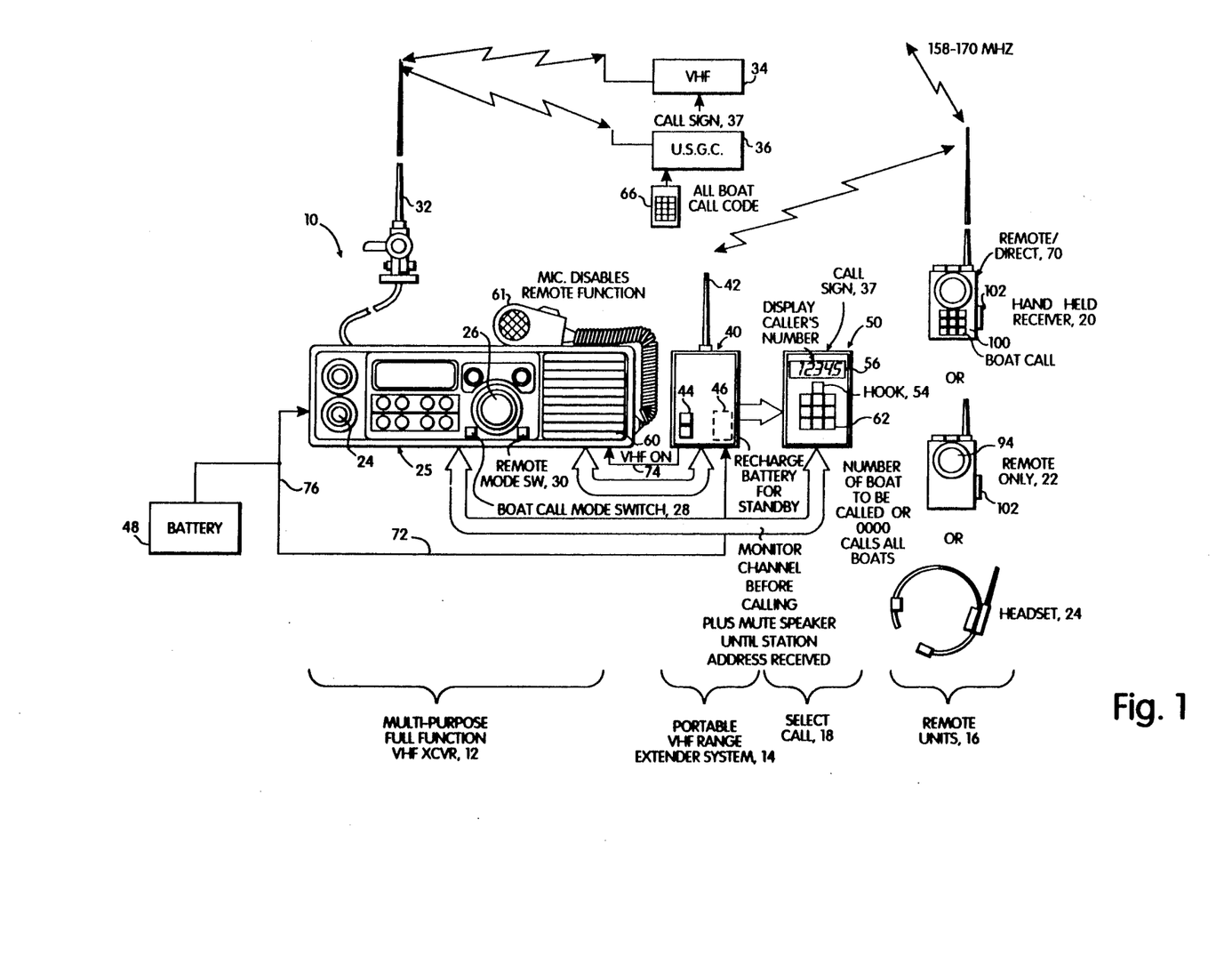
FIG. 1 is a diagram of a modularized communication system of which the Subject Invention is a part.

Referring now to FIG. 1, a modular communication system 10 includes a multi-purpose full function transceiver 12 to which is connected a portable range extender system 14 having remote units 16 and a select-call system 18. As will be discussed, remote unit 16 includes a portable transceiver 20 with or without a select call function; and with a function so that it can be switched to direct transmission, as opposed to remote control of the station base. Moreover, a remote only unit 22; or a head-set mounted unit 24 may be provided. It is the purpose of all of these systems to utilize a multi-purpose full-function base station transceiver 25 to be both a full function transceiver having an on/off switch 24, a channel selection switch 26, and switches 28 and 30 directly related to the add on range extender and select-call units, with switch 28 placing the system in a boat call mode, and switch 30 placing the system in a remote control mode. Absent activation of either the boat-call mode switch 28 or the remote switch 30, transceiver 25 acts in its normal mode to transmit and receive signals via its associated antenna 32 to either other VHF transceivers 34 or to coast guard or other government transceivers 36.

With respect to the select-call function, a call sign may be provided for each base station transceiver 25, such as illustrated by call sign 37, with the associated select-call module 50 being provided with a DIP switch set number corresponding to the last four digits of the call sign assigned to the particular base station by the Federal Communications Commission or other governmental authority.

It will be appreciated from this figure that base station 25 is under the control of a base control transceiver unit 40 which can include it's own transmit/receive antenna 42 and an on/off switch 44. It is a property of the base control transceiver 40 that it have an internal rechargeable battery 46 which places the base station control unit 40 in a standby mode in which its power drain is minimal. Upon receiving an appropriate authorization or ID code from a portable transceiver 20, the base control transceiver unit 40 switches power from ship's battery 48 through to base station 25 to turn this unit on. From this point in time the base station is under the control of the portable range extender system such that the full range of the base station is now afforded to the portable transceiver, in this case transceiver 20 operating on 49 MHz. It ill however be appreciated that any of the remote units pictured in FIG. 1 can address the base control unit to power up the base station upon receipt of the appropriate authorization code and carrier as mentioned hereinbefore. Ship's power is shown provided over line 72 to the base control unit 40, with a line 74 which powers the base station Additionally, power over line 76 may be provided directly to the base station for normal operation.

The purpose of the portable receiver 20 is to control the operation of the base station 25 such that it effectively extends the nominal range of a portable unit to that commensurate with the base station. If the base station is a 25 watt unit operating on a 158–170 MHz, the nominal range of this unit is 25 miles. Should the base station be an SSB or other type of station then the range is considerably increased. The additional purpose of having the portable transceiver control the base station is that it is possible to provide a hands-free operation so that the person operating the vessel can communicate without attendant wires and the inconvenience thereof. More importantly, the volume necessary for audiblization of the receive signals from the base station is minimized because the remote unit is capable of providing audiblization at the user, as opposed to providing a speaker with sufficient power in order to be able to be heard over engines of the vessel. This is particularly valid for the set mounted unit 24.

With respect to the select-call system 18, modular unit 50 is provided with a key pad 62 through which the call sign or other identification digits are transmitted via the base station to recipient units. Additionally, the key pad has a hook switch 54 which operates in much the same way as telephone hook switches operate. It will be appreciated that the select call unit has a display 56 which displays the caller's number as illustrated so that not only will the operator of the select-call unit be able to address another base station, but also the identification of the calling base station is immediately provided. This is possible because of the transmission via the base station of the base station's own call sign which is dialed in or provided as illustrated at 37.

One of the more important features of the select call system, especially when utilized on multi-channel unrestricted bands is that prior to the dialing up of a particular address or call sign, the base station is put in its receive mode so that prior to "dialing" the operator can check to see if the particular channel is clear. This therefore prevents the inadvertent transmission of call sign and placing a transmitter on the air when the channel is occupied.

It will also be appreciated that while the purpose of providing the select-call feature is to mute the speaker here illustrated at 60 so that only desired traffic is heard, an emergency situation can be indicated by depression of the zero pad here illustrated at 62 four times which sends a (0, 0, 0, 0,) code to activate all base stations in the area. Also, as illustrated the coast guard unit or police unit is provided with an all boat call code sending unit 61 which provides for this function.

What will be appreciated is that for emergency situations any vessel having this capability can turn on any vessel within the calling area as can the governmental authorities. It will also be appreciated that the keying of microphone 66 disables the remote function so that the base station radio can be operated in the normal manner.

What is therefore provided is the convenience of a remote capability for the base station to extend the range of a portable unit, while additionally providing the multi-purpose full function base station with a select call or boat call function.

It will be noted that portable transceiver 20 may be provided with a remote/direct mode switch 70 which can be utilized to switch the unit from the remote control frequency for the range extender system to direct communications on the base station frequency band.

It is a function of the subject modular system that the units can be added modularly to an existing multi-purpose transceiver such that the various functions which are desired by the user can be added on.

Figure 2:
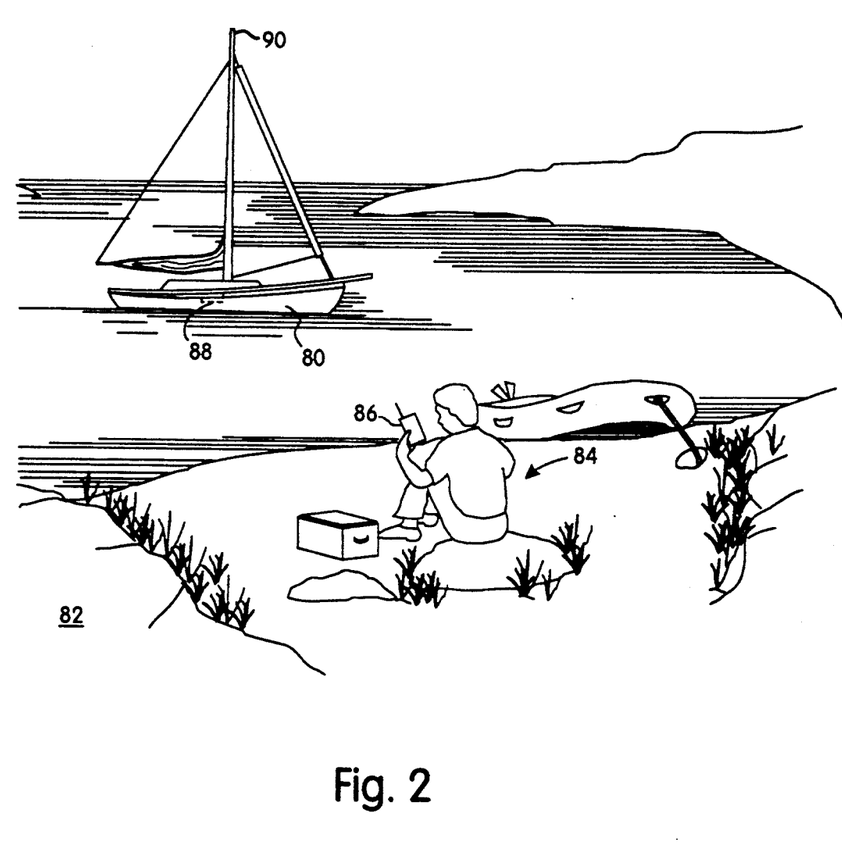
FIG. 2 is a diagram of one of the uses for the Subject Invention, showing range extension via the base station on a boat.

Referring now to FIG. 2 a typical situation is depicted in which a boat 80 is moored off a beach 82 in which an individual 84 carries with him a portable remote transceiver 86. As can be seen there is a base station shown in dotted outline at 88 and an elevated antenna 90 which serves as the main communications antenna for the base station on the vessel is connected to the base station.

Prior to the time that communication is desired between the individual on the beach and a remote location, the base station is turned off and the base station control unit is in its quiescent state being run on its internal rechargeable battery. It does not matter that the battery of the boat is turned off because the battery cable to the base station control unit is permanently attached to the positive terminal of the ship's battery. This being the case, when the appropriate authorization signal is received by the base station control unit, this unit applies power to turn on the base station. Referring back to FIG. 1 at this point in time the channel selected for the base station is that dictated by channel selector switch 94, with the squelch for the base station being set by squelch switch 96. The volume for the portable unit is set by switch 98 such that complete configuration of the base station is accomplished through the utilization of the portable unit. The select-call function is provided by keys 100 on the portable unit 20, should the select-call function be desired. As can be seen with respect to FIG. 1, each of the portable units has a push-to-talk switch 102 or, in the case of the head set this switch function can be provided by a voice operated relay (VOX).

What will be appreciated from the FIG. 2 illustration is that if the relatively inexpensive portable unit is within, for instance, 1,000 feet of the base station, effective communications can be completed whether the individual is off the boat on a beach, in a dingy near the boat, in a house not far from the place where the boat is moored, or in fact when an individual is on the boat, piloting the boat. This latter Case is important because the subject system gives the individual a hands-free long distance communication capability while he is involved in the piloting of a boat. This is especially useful in emergency situations in which the skipper of a boat has both to communicate with rescue vessels and also provide for the safety of himself, his crew and his vessel.

Figure 3:
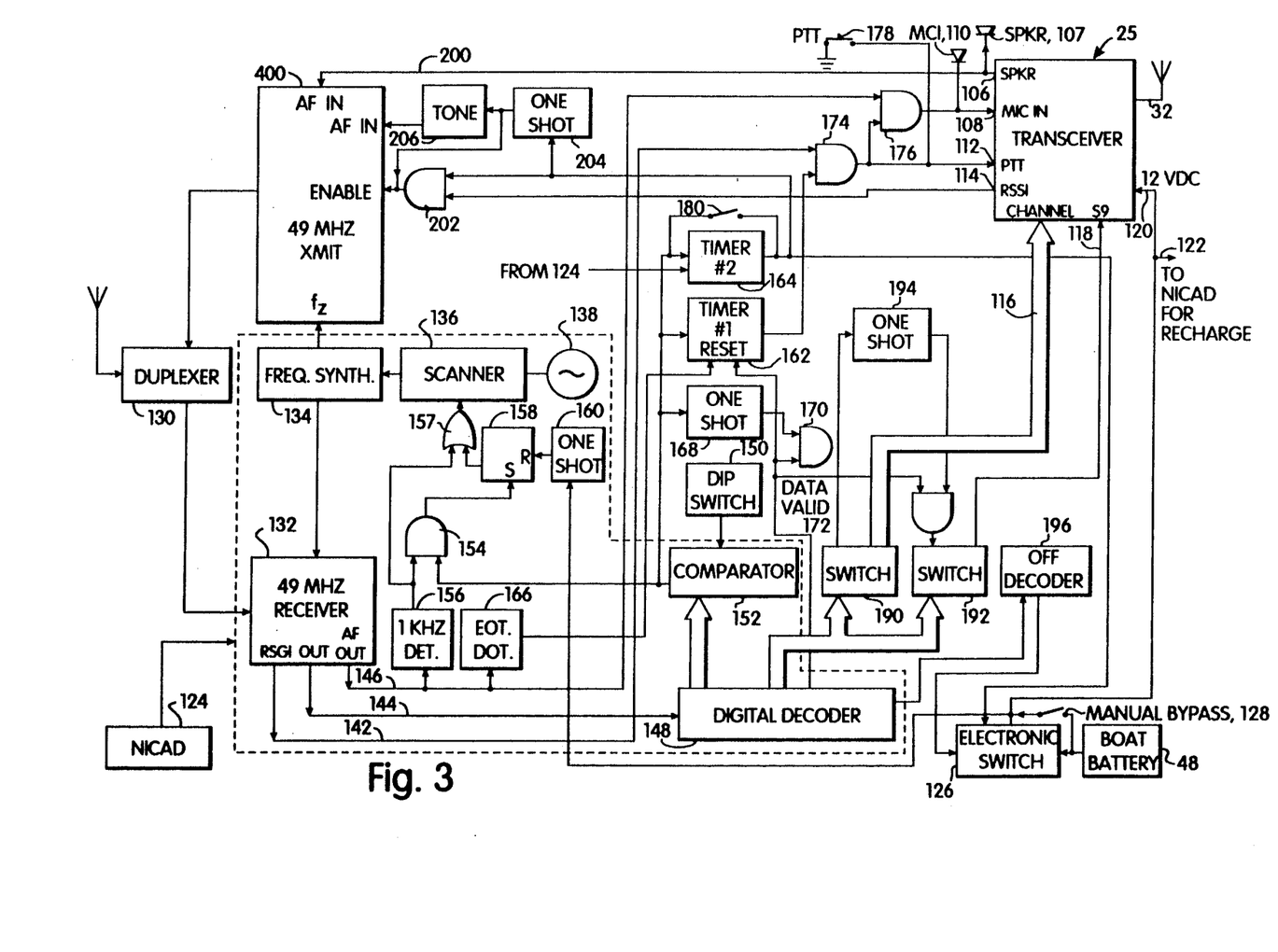
FIG. 3 is a block diagram of one embodiment of the portable receiver.

Referring to FIG. 3 base station 25, is provided with the following input and outputs:

First there is a speaker output 106 which is provided to a speaker 107. Secondly, there is a "microphone in" input 108 coupled to a microphone 110. Thirdly, there is a push-to-talk input 112, as well as an RSSI output 114. Additionally there is a channel selection bus 116 which controls the channel of the base station transceiver. There is also a squelch control input 118, as well as a 12 volt power input 120. Power to an internal NICAD battery 124 is provided over line 122. An electronic switch 126 controls the application of power to transceiver 25 when an authorized incoming signal arrives from the associated portable unit. This switch may be manually bypassed via a switch 128 such that in battery 48 have its power applied directly to transceiver 25. Alternatively, the base station may have its own on/off switch such as shown at 24 in FIG. 1.

The base control unit 40 includes its own antenna 42, which in this case is coupled to a duplexer 130 the output of which is coupled to the receiver portion 132 of the base control unit. This system envisages a split channel communication between the base control unit and the portable unit, with the split channel receive frequency being illustrated as $f_1$. Note that the channel and thus the frequency of this unit is controlled by a frequency synthesizer 134 under the control of the scanner 136 which is under the control of the scanning oscillator 138. In operation, as long as there is NICAD power, the scanner repeatedly scans until instructed to stop upon the finding of a clear channel by the portable unit. This is signalled by provision of a 1 kHz tone on the selected channel. Thus if receiver 132 detects the 1 kHz tone it will be tuned to the channel selected by the portable unit as being clear. Otherwise the scanning continues at the base control unit. Thus the scanning of the base control unit is asynchronously controlled by the portable unit. The transmitter 140 for the base control unit is assigned the second split channel frequency $f_2$ and is also under the control of frequency synthesizer 134. It is thus the purpose of frequency synthesizer to scan the available channels and to set the transmit and receiver channel for that which is as noise free or clear as possible.

It will be appreciated that receiver 132 has an RSSI output 142, a tone burst code output 144, and an audio frequency output 146. The burst code output is applied to a digital decoder 148 which compares the authorization code to a predetermined code set through dip switch 150 via comparator 152. The output of comparator 152 is a signal indicating authorization code receipt, which signal is applied to a gate 154 having its input coupled to a 1 kHz detector 156, the purpose of which is to detect the aforementioned scanner tone. This sets a flip/flop 158 which stops the scanning. Flip/flop 158 is reset by the output of a one shot multivibrator 160 which is activated with any power interruption switch 126 or its manual bypass switch 128. The purpose of the one-shot multivibrator is thus to reset flip/flop 158 to commence scanning when power is turned off. Electronic switch 126 is turned off either by the output of timer 164, the long timer; or by an end of use signal detected by off decoder 196.

Thus, with respect to the channel selector, the portable unit searches until such time as it finds a clear channel. When one seeks to establish communications with base station 25, the portable unit sets up a 1 kHz tone which is detected at 156. A voltage is applied through OR gate 157. This causes a momentary cessation in scanning while awaiting the authorization code. Upon detection of the authorization code, gate 154 is activated assuming there is an authorization code pulse from comparator 152 to set flip/flop 158. This locks the momentarily stopped scanner until power down. Scanner 136 thus continually scans under the control of oscillator 138 until such time as the authorization code is present along with the detected 1 kHz audio tone. At this point the scanner stops, with receiver 132 and transmitter 140 being tuned to the channel indicated by the scanner when it is stopped. It will appreciated that scanner 136 searches continuously until receiver 132 detects a 1 kHz tone. This indicates that the channel to which the receiver was then tuned is the appropriate channel as indicated by the portable unit. The reason for the use of the authorization pulse in addition to the detection of the 1 kHz pulse is that the scanner may be stopped in its scanning mode by another unit's portable unit, but the appropriate authorization code is not received. This prevents the scanner from locking up on a channel due to the transmission of a signal from an unauthorized 49 megahertz source.

The authorization code is applied to a short timer as illustrated at 162 and also to a long timer illustrated at 164. Timer 162 controls PTT input 112 to limit the base station transmission in the absence of reactivation by the PTT switch on the portable unit. Timer 162 is thus reset by the output of an end of transmission detector 166 which is coupled to the audio frequency output of receiver 132 to detect an end of transmission tone. Timer 162 is also reset by a valid data output from decoder 148 indicating that the incoming data stream meets a predetermined format, regardless of a received authorization code. Resetting timer 162 turns off the base station transmission. This means the base station will not transmit channel selection information, squelch adjustment information, or the transmission from a portable unit with a different authorization code.

As mentioned before, this valid data signal is applied to timer 162 which applies a one to two minute pulse to gate 174, which has as its other input a signal over RSSI line 142, thereby to actuate the push-to-talk switch within transceiver 25 if there is an authorization code and a carrier of sufficient strength. This means that when there is sufficient signal from the portable unit, transceiver 25 is placed in transmit mode, whereupon the audio out signal on line 146 passed through gate 176 is applied to the microphone input 108. A push-to-talk button 178 on microphone 110 overrides any lack of PTT signal from gate 174 to place transceiver 25 in its transmit mode.

Timer 164 is utilized to turn on electronic switch 126 some relatively long predetermined time, such as ten to fifteen minutes after an authorization code has been received. This provides a 15-20 minute power up of all units upon receipt of a valid authorization code. There is a manual override switch 128 which is utilized to bypass timer 164 so as to keep all circuits in the base control unit on, as well as transceiver 25. Turning off all unnecessary circuits after 15 minutes limits power drain and also unintended transmission from the base control unit to the portable unit.

It will be noted that additionally the output of comparator 152 is coupled to a one shot multivibrator 168 applied to a gate 170, having as its other input the aforementioned valid data signal 172 from digital decoder 148. It will be appreciated also that the output of digital decoder 148 is coupled to a switch 190 which upon digital decoding of the burst received at receiver 132 sets the channel of transceiver 25. A switch 192 is also connected to the output of digital decoder 148 which senses the particular squelch dialled in by the portable unit and sets the squelch of transceiver 25.

Switches 190 and 192 are prevented from controlling the base station unless there is a valid authorization code and valid data signal. Since the order of receipt of codes is the 1 kHz tone code, authorization code, channel code, and squelch code, one shot multivibrators turn on switches 190 and 192 in a timed sequence after authorization code receipt.

It will be appreciated that one shot multivibrator 168, upon receipt of authorized code produces an elongated pulse to gate 170 which if there is valid data provides a signal to activate switch 190 and also provides a signal via one shot multivibrator 194 to turn on switch 192 a predetermined time thereafter, thereby to activate it for a predetermined period of time so as to set the squelch. This predetermined period of time allows the squelch to be set when there is valid data and when there is an output from one shot multivibrator 168. Note a decoder 196 detects a signal from decoder 148 in response to a digital signal from the portable unit indicating that it is turned off. Unit 196 thus turns off electronic switch 126, thereby to turn off both the base station and all circuits not necessary to detection of signalling from the portable unit.

With respect to transmission to the remote control transceiver there is an audio in input 200 from the speaker out terminal 106 which provides received signals from transceiver 25 through transmitter 140 to duplexer 132 and thence to antenna 42. It will be appreciated that transmitter 140 is enabled via a signal from gate 202 which is activated via the simultaneous occurrence of a signal from the RSSI output of transceiver 25 and a signal from timer 164 indicating receipt of an authorization code such that upon receipt of a signal from transceiver 25 transmitter 140 is keyed to transmit received signals to the portable unit Enabling of transmitter 140 via timer 164 results in a one shot multivibrator providing a pulse to a tone generator 206 which generates a brief audio frequency in tone for the purpose of signalling to the user of the portable unit that the remote control circuit is operational and the base station is turned on.

It will be appreciated that when base station 25 is in the transmit mode, the RSSI signal drops to zero which disables transmitter 140 during the base station transmission.

It will be appreciated that end of transmission detector 166 operates such that when an end of transmission signal is detected through the release of the PTT button on the portable unit the push-to-talk function is deactivated, thereby placing transceiver 25 in the receive mode. It will thus be appreciated that detector 166 detects an end of transmission tone upon the release of the push-to-talk button from the portable unit.

It will also be appreciated that with respect to the digital decoder 148 the transmitted burst from the portable unit to the base control unit will not actually be transmitted by transceiver 25. This is because transceiver 25 will not transmit until the receipt and processing of an authorization code. Thus that which is transmitted from the base station will exclude that signalling between the portable unit and the base station control unit.

Figure 4:
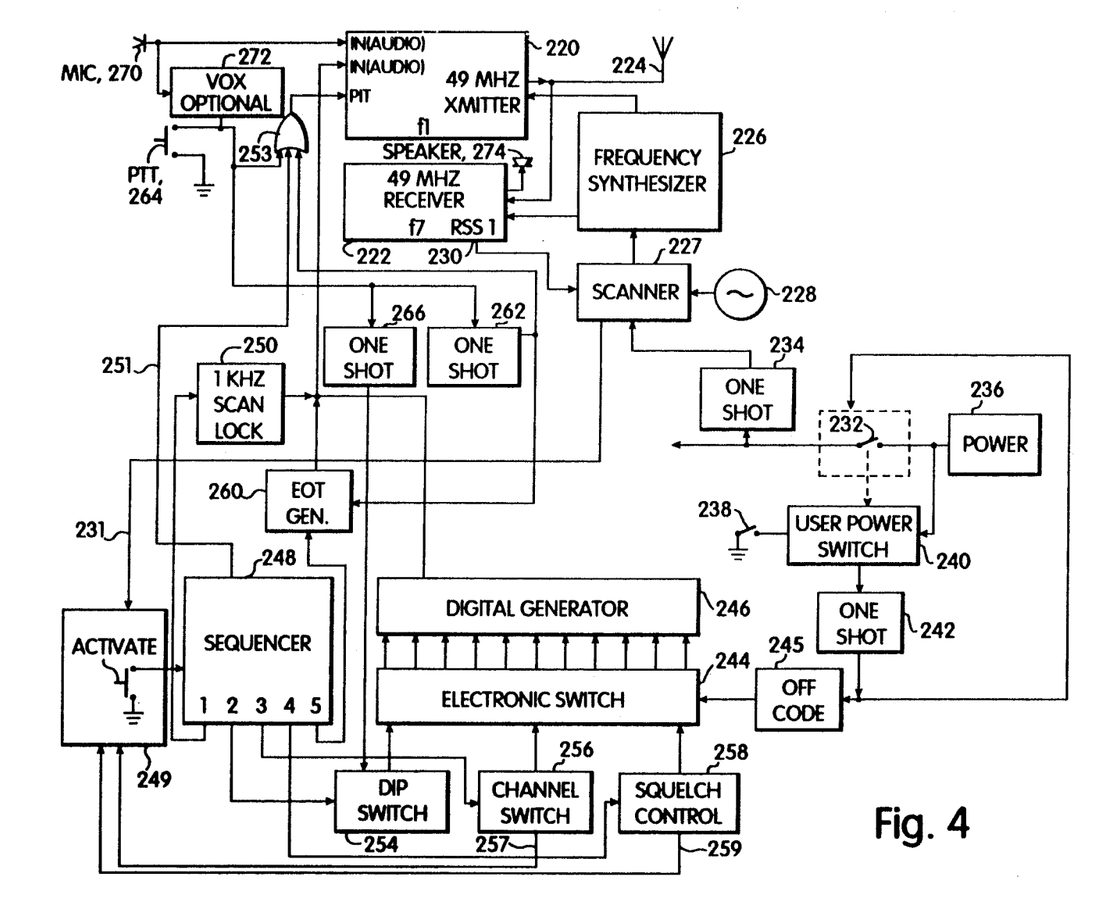
FIG. 4 is a block diagram of one embodiment of the base station control unit; and, FIG. 5 is a block diagram of the boat-call portion of the modular system.

Referring now to FIG. 4, the portable unit itself contains a transmitter 220 and a receiver 222 with the transmitter and receiver being coupled to antenna 224. The frequency of the transmitter is $f_1$ and the frequency of the receiver is $f_2$ which are the split channels referred to hereinbefore. The particular channel is determined by frequency synthesizer 226 under control of scanner 227 which is caused to scan by an oscillator 228. The input to the scanner is connected to the RSSI output 230 of receiver 222, with scanner 227 being powered via electronic switch 232, which activates a one shot multivibrator 234 to provide a pulse to scanner 227 to commence scan. After a clear channel has been found, the scan sequence is disabled. Thereafter turning the power off resets the scanner such that another power-on sequence restarts the scan. Note that switch 232 is actuated by a manual switch 240, with switch 232 coupled to a battery 236 which is internal to the portable unit. The turn on of switch 240 applies power to sequencer 248 which once scan lock is established over line 231 activates sequencer 248 via activation circuitry 249. Upon activation of the sequencer, a signal is coupled on line 251 to OR gate 253 to place transmitter 220 in the transmit mode for the duration of the sequence. This also grounds out the output of one shot multivibrator 262 so that no tone from end of transmission generator 260 can exist until after the squelch control is read out steps through the following sequence. The first output from sequencer 248 results in the generation of a tone by tone generator 250 once a clear channel has been detected as an output of scanner; 227 when the RSSI output 230 is below a predetermined threshold. This locks up the scanner and places a pulse on line 231 to activate the sequence. As a result a tone is coupled to transmitter 220. The purpose of providing a 1 kHz scan lock is so that whatever frequency transmitter 220 is tuned to upon lock, the lock condition will be signalled to the base control unit. The second output of the sequencer causes an authorization code to be read by electronic switch 244 into digital generator 246. This code is entered at DIP switch 254 which outputs the factory-set I.D. code to the electronic switch upon command from sequencer 248.

The output of generator 246 is also applied to the audio input of transmitter 220. This is applied to the audio input as a digitally-coded burst, either on a subcarrier or via direct modulation of the generator 246. Thereafter, the channel selector switch 256 is polled by electronic switch 244 and the channel selected thereby is digitized and coupled to the audio input to transmitter 220, again as a digitally coded burst. After transmitting the channel code, the sequencer accesses squelch control unit 258 which is read by electronic switch 244 with the output thereof being encoded by digital generator 246 and outputted again to the audio input to transmitter 220. Finally, there is an end of transmission tone generated at 260 which is applied to the audio input to transmitter 220. The end of transmission code is generated at 260 in response to the last portion of the sequence of sequencer 248. It will be appreciated that this end of transmission code places the portable unit in its receive mode so that once the unit is turned on, after providing the appropriate authorization code and all other codes to the base control unit, the system is automatically placed in the receive mode so that the individual operating the portable unit may listen to whatever channel he has selected. It will be noted that the sequencer is only actuated during the turn on of the power to the portable unit or via signals over lines 257 and 259 to activate unit 249 when the channel switch has been moved or when the squelch control has been changed. The sequencer therefore is only operative during initial turn on or for changes in the channel switch or squelch control. There is one other situation in which the end of transmission tone is developed and this is as a result of an output pulse from one shot multivibrator 262 which provides a pulse when PTT switch 264 is released. The output of one shot multivibrator 262 is provided to end of transmission generator 260 which outputs a tone to the audio input of transmitter 220 while at the same time providing a signal to OR gate 253 to hold on the PTT function of the transmitter for a predetermined time dictated by the time out constant of one shot multivibrator 262. The purpose of one shot multivibrator 262 is to make sure that the end of transmission tone generator is activated and usable after the push-to-talk button has been released.

There is also an additional one shot multivibrator 266 which senses the depression of push-to talk switch 264 after an initial sequence has been transmitted which results in the activation of DIP switch 254 being read by electronic switch 244 which outputs the authorization code via digital generator 246 each time the push-to-talk switch is depressed at the portable unit.

When the operator of the portable unit turns off the power to the unit via switch 238, one shot multivibrator 242 senses this condition and activates electronic switch 244 to send an authorization code followed by an end of use code generated by unit 245 prior to shutting down the power to the portable unit. The shut down of the power to the portable unit is delayed through the delayed actuation of electronic switch 232 which is under the control of one shot multivibrator 244 which delays the shut down of the power to the portable unit until such time as the end of use code can be transmitted.

It will be appreciated that the portable unit may be provided with an optional voice operated relay, VOX 272, which operates in the normal manner, to place the hand-held unit in the transmit mode during input to microphone 270.

With respect to the receive function of the portable unit, receiver 222 operates in the normal mode at frequency $f_2$ which is one portion of the split channel to receive signals from the base control unit over the 49 MHz band, in the marine service situation. The output of receiver 222 is applied to a speaker 274 so that the receive signals at the base station will be audiblized at the portable unit.

It will also be appreciated that the portable unit may be provided with a full up additional transceiving circuit so that direct communications over the base station channel can be achieved. It will appreciated that in this case that two antennas may be necessary tuned to different frequencies. Since the range of the portable unit, in one embodiment is only 1,000 feet, the antenna for this can be housed within the whereas for direct transmission one would desirably utilize the conventional flexible whip antenna.

As a further function of the subject system once the sequencer has gone through its full sequence a beep will be heard at the portable unit which tone is produced by the base control unit as mentioned hereinbefore. This indicates that the portable unit is within range of the base station and that communication has been established.

Figure 5:
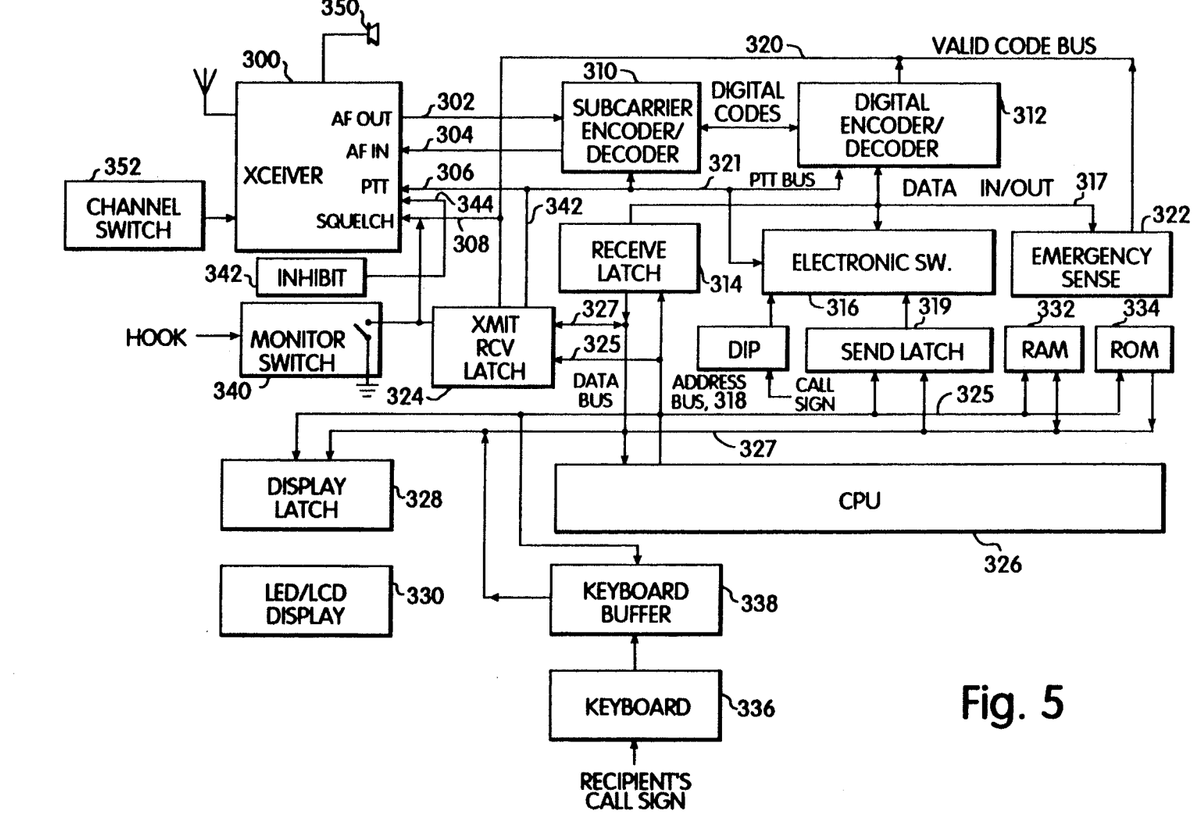

Referring now to FIG. 5 in the select-call system a transceiver 300, which may be a marine VHF receiver or any multi-channel receiver includes an audio frequency output terminal 302, an audio frequency input terminal 304, a push-to-talk terminal 306 and a squelch terminal 308. As will be seen the audio out terminal 302 is coupled to a subcarrier encoder/decoder unit 310 which is in turn coupled to a digital encoder/decoder unit 312. A receive latch 314 is coupled over a data bus to digital encoder/decoder unit 312 with an electronic switch 316 having DIP switch 318 inputs thereto as well as the input of a send latch 319. The output of electronic switch 316 is coupled to a data bus 317 which connects together receive latch 314, the electronic switch 316, an emergency code sense unit 322 and the digital encoder/decoder 312. It will be appreciated that there is a push-to-talk bus 306 which is connected between push to-talk terminal 306 and the digital encoder/decoder.

It will also be noted that there is a valid code bus 320 which is coupled from digital encoder/decoder 312 and unit 322 to squelch control terminal 308 and also to a transmit/receive latch 324. The inputs and outputs to the receive latch are first an address bus 325 which is connected between transmit/receive latch 324, CPU 326, send latch 319, a RAM 322, a ROM 334, and a keyboard buffer.

It will also be appreciated that the data and address busses are respectively coupled to a display latch 328, which is in turn coupled to a display unit 330 which may be an LED or LCD type display, the purpose of which is to display the caller's call sign and the call signs stored in the RAM for future use.

In the receive operation, it is assumed that a distant transmitter is transmitting the call sign of the recipient unit, as determined by DIP switch 318 to receiver 300. Audio from the receiver at output 302 is converted to a data stream by encoder/decoder unit 310. Signals from the encoder/decoder 310 are decoded by the encoder/decoder 312 into paralleled data which is outputted to the data in/out bus 317 and a valid data output as part of the bus. This recovered data is stored in receive latch 314 and is compared with the code in DIP switch 318, as well as the emergency sense code. How this is accomplished is as follows.

The push-to-talk bus 321 is in the receive mode which enables electronic switch 316 to output the call sign entered into DIP switch 318. The call sign is thereby dumped into the digital decoder 312 where it is compared to the incoming code. Also the incoming data is applied to the emergency sense unit 322 to ascertain if there is an emergency coded signal being received. Upon receipt of an emergency coded signal, a valid code signal is applied to bus 320 which demutes the receiver through the squelch terminal 308 and also sets a latch in the transmit/receive latch 324 so that the CPU 326 can determine that a valid code has been received. This in essence turns ON transceiver 300 into the receive mode. Thereafter, upon either the demuting of the receiver through an emergency sense detection, or through comparison to the DIP switch so that the particular receiving unit is unsquelched, next encoder/decoder 310 decodes the call sign of the transmitting station which is stored in the receive latch through the digital encoder/decoder 312. The CPU then transfers the caller's call sign to the display latch 328, with the result that display 330 displays the call sign of the incoming transmission. This incoming call sign may also be stored in RAM 332 should such be desired.

This receive mode is such as to result in receiver 300 being muted until such time as either an emergency code has been received and decoded, or until such time as its particular call sign or address code has been received and decoded. At this time the transceiver 300 is placed in its normal mode of operation.

With respect now to the transmit cycle for the select-call, the intended recipient's call sign is punched in at keyboard 336 or is taken from the RAM 332 where it is previously stored. Of course, storing of a number of call signs is under control of ROM 334 and keyboard 336 such that any entered data is placed into the CPU through keyboard buffer 338. It is also possible to instruct the RAM to output the last call sign received, thereby to address the last station which has transmitted traffic to the station in question.

With respect to addressing a selected station, the call sign entered into keyboard 336 is routed over data bus 327 to send latch 319. If the transceiver 300 is desquelched or in its monitor mode, material in the send latch is transmitted to the digital encoder/decoder 312 via electronic switch 316, as well as the call sign of the transmitting station entered into DIP switch 318. CPU 326 also controls the push-to-talk function of transceiver 300 in this procedure, whereby the transceiver 300 is placed in the transmit mode. This is accomplished through the transmit/receive latch 324 which places a signal over line 342 to place transceiver 300 in the transmit mode.

Prior to the transmission of the call sign of the intended recipient in the transmit mode, transceiver 300 is placed in its receive or monitor mode under control of ROM 334 which prior to the release of send latch 319 causes transmit/receive latch 324 to open the squelch circuit of transceiver 300 such the user can verify that the channel is not already in use This can be done through the monitoring the channel via speaker 350.

It should be noted that the audio frequency out terminal 302 is connected before the squelch control and volume control so that transmitted codes can be received regardless of the condition of the speaker drive.

It will thus be seen that as feature of the Subject Invention prior to the addressing of the transmitting station via the subject unit in the transmit mode, the transceiver 300 is placed in its receive mode with an unsquelched speaker so the the channel selected by channel selector switch 352 can be monitored.

It will therefore be appreciated that any actuation of the keyboard causes the transceiver 300 to be placed in its monitor mode, at least for a predetermined period of time under control of ROM 334.

What will be appreciated is that the Subject System can be utilized for a selective call feature or to active all transceivers in the area when an emergency number is punched in at the keyboard. Moreover, a monitor switch 340 is provided which corresponds to the hook button 54 of FIG. 1. The purpose of this is to permit monitoring of a given channel in a manual mode. The output of this switch not only opens the squelch of transceiver 300, but also through inhibit circuit 342 inhibits the push-to-talk function whereby transceiver 300 might otherwise be placed in the transmit mode. In any event, if the transceiver is in a squelched mode the push-to-talk function of the transceiver is overridden thereby.

Having above indicated a preferred embodiment of the present invention, it will occur to those skilled in the art that modifications and alternatives can be practiced within the spirit of the invention. It is accordingly intended to define the scope of the invention only as indicated in the following claims.

We claim:

1. A system for extending the range of portable transceivers adapted to operate in a first multi-channel unrestricted band comprising:

a multi-channel RF base station transceiver operating in an unattended mode in said band on a simplex basis and having and antenna coupled thereto for relatively long distance communication;

a base control unit coupled to said base station transceiver for transmitting and receiving signals to and from said base station for the control thereof, said base control unit including a duplex transmission capability including means for transmitting RF signals to said portable transceiver on a first split channel within a second multi-channel unrestricted band, and means for receiving RF signals from said portable transceiver on a second split channel within said second unrestricted band;

a power supply at said base station transceiver; and, a portable transceiver operating in said second multi-channel unrestricted band, said portable transceiver having means for receiving and demodulating signals from said base control unit and for reproducing and demodulated signals; and, means for transmitting to said base control unit on one of said split channels signals representing voice communications, a signal for actuating said base station transceiver upon the activation of said portable unit, an authorization code signal such that said base station transceiver will only be under the control of said portable transceiver, a channel select code signal for setting the channel of said base station transceiver, and an end of transmission code signal for placing said base station transceiver in its receive mode, said base control unit receiving means having means responsive to said signals from said portable transceiver for controlling said base station transceiver in the manner dictated thereby.

2. The system of claim 1, wherein said portable transceiver further includes means for transmitting an end of use signal to said base control unit and wherein said base control unit includes means, responsive to receipt of said end of use signal for removing power to said base station transceiver.

3. The system of claim 1, wherein said portable transceiver includes push-to-talk switch means and wherein said authorization code signal is transmitted every time said push-to-talk switch is depressed.

4. The system of claim 3 wherein said end of transmission code signal is transmitted to said base control unit when said push-to-talk switch mean is released.

5. The system of claim 3 wherein said base control unit has a long term timer, means for activating said long term timer upon receipt of said authorization code, and means responsive to the time-out thereof for turning off the power to said base station transceiver.

6. The system of claim 3 wherein said base control unit includes a short term timer, means for activating said short term timer upon receipt of said authorization code, and means responsive to the time-out thereof for placing said base station transceiver in a receive mode.

7. The system of claim 1 wherein said base station transceiver has squelch means, and wherein said portable transceiver further includes means for transmitting a squelch control signal to said base control unit and wherein said base control unit includes means responsive to receipt of said squelch control signal for controlling the squelch means of said base station transceiver.

8. The system of claim 1 wherein said base station transceiver operates in both an attended and unattended mode.

9. The system of claim 8 and further including a separate module for said base station transceiver and said base control unit, said base station transceiver module having requisite connections on the module case thereof to permit connection of said base control module thereto.

* * * * *